United States Patent
Dudar

(10) Patent No.: US 9,651,002 B2
(45) Date of Patent: May 16, 2017

(54) SYSTEMS AND METHODS FOR REDUCING BLEED EMISSIONS

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 296 days.

(21) Appl. No.: 14/495,796

(22) Filed: Sep. 24, 2014

(65) Prior Publication Data

US 2016/0084175 A1    Mar. 24, 2016

(51) Int. Cl.
| | | |
|---|---|---|
| *F02D 41/00* | (2006.01) | |
| *F02M 25/08* | (2006.01) | |
| *B60W 20/00* | (2016.01) | |
| *F02D 41/04* | (2006.01) | |
| *B60K 15/035* | (2006.01) | |

(52) U.S. Cl.
CPC ..... *F02M 25/0809* (2013.01); *F02D 41/0032* (2013.01); *F02D 41/0035* (2013.01); *F02D 41/0045* (2013.01); *F02M 25/089* (2013.01); *F02M 25/0818* (2013.01); *F02M 25/0836* (2013.01); *F02M 25/0854* (2013.01); *B60K 15/03504* (2013.01); *B60K 15/03519* (2013.01); *B60W 20/00* (2013.01); *F02D 41/042* (2013.01)

(58) Field of Classification Search
CPC ........... F02D 41/0032; F02D 41/0035; F02M 25/089; F02M 25/0818; F02M 25/0836; F02M 25/0881

USPC ................. 123/518–520; 73/114.39
See application file for complete search history.

(56) References Cited

U.S. PATENT DOCUMENTS

| | | | |
|---|---|---|---|
| 5,975,062 A | 11/1999 | Bonse et al. | |
| 6,293,261 B1 | 9/2001 | Oemcke et al. | |
| 6,551,388 B1 | 4/2003 | Oemcke et al. | |
| 6,659,087 B1 * | 12/2003 | Reddy | F02D 41/0045 123/357 |
| 7,536,251 B2 * | 5/2009 | Saito | B60W 10/26 123/480 |
| 8,181,631 B2 | 5/2012 | Bohr et al. | |
| 8,813,726 B2 * | 8/2014 | Nagasaku | F02M 25/089 123/519 |
| 9,097,216 B2 * | 8/2015 | Itoh | F02M 25/0854 |
| 2002/0162457 A1 * | 11/2002 | Hyodo | F02M 25/089 96/109 |

(Continued)

OTHER PUBLICATIONS

Anonymous, "An EVAP System With Condenser Unit to Minimize Diurnal Bleed Emissions," IPCOM No. 000240777, Published Feb. 27, 2015, 2 pages.

(Continued)

*Primary Examiner* — Erick Solis
(74) *Attorney, Agent, or Firm* — James Dottavio; McCoy Russell LLP

(57) ABSTRACT

A method for a fuel system, comprising: during a first condition, including an engine-off condition and a sealed fuel tank, directing fresh air into a fuel vapor canister responsive to detecting hydrocarbons in a canister vent line. By directing fresh air into the fuel vapor canister, fuel vapor stored within the canister may be redistributed away from the canister vent line. In this way bleed emissions from the fuel system may be reduced without the need for a dedicated bleed canister.

19 Claims, 10 Drawing Sheets

(56) References Cited

U.S. PATENT DOCUMENTS

| | | | |
|---|---|---|---|
| 2009/0070001 A1* | 3/2009 | Takakura | F02D 41/0032 701/102 |
| 2010/0012098 A1* | 1/2010 | Kobayashi | F02D 41/0032 123/519 |
| 2010/0252005 A1* | 10/2010 | Kitamoto | B60K 6/48 123/518 |
| 2013/0152905 A1 | 6/2013 | Woods et al. | |
| 2013/0253799 A1* | 9/2013 | Peters | F02M 25/0818 701/102 |
| 2013/0255645 A1* | 10/2013 | Grass | F02M 25/0818 123/520 |
| 2013/0269660 A1 | 10/2013 | Peters et al. | |
| 2014/0013944 A1* | 1/2014 | Haag | F02M 25/0818 95/146 |
| 2014/0303830 A1* | 10/2014 | Dudar | F02M 25/0809 701/29.1 |
| 2015/0083089 A1* | 3/2015 | Pearce | F02M 25/0809 123/520 |
| 2015/0153291 A1* | 6/2015 | Harms | F02M 25/0854 73/114.38 |
| 2015/0345411 A1* | 12/2015 | Ooiwa | F02D 41/004 123/520 |

OTHER PUBLICATIONS

Dudar, Aed M. et al., "System And Method For A Leak Check Module Comprising A Reversible Vacuum Pump," U.S. Appl. No. 14/248,024, filed Apr. 8, 2014, 58 pages.

Dudar, Aed M., "System And Methods For Purging A Fuel Vapor Canister," U.S. Appl. No. 14/301,246, filed Jun. 10, 2014, 39 pages.

Dudar, Aed M., "System And Methods For Evaporative Emissions Testing," U.S. Appl. No. 14/338,025, filed Jul. 22, 2014, 38 pages.

\* cited by examiner

SYSTEMS AND METHODS FOR REDUCING BLEED EMISSIONS

BACKGROUND AND SUMMARY

Vehicles sold in North America are required to adsorb refueling, diurnal and running loss vapors into a carbon canister. When the canister is loaded with fuel vapor, the contents may be purged to engine intake using engine intake vacuum to draw fresh air though the canister, desorbing bound hydrocarbons. Strict regulations regulate the performance of evaporative emissions systems.

Hybrid vehicles, and other vehicles configured to operate with minimal or no intake vacuum may have limited opportunities to purge the fuel vapor canister. Even in standard engine vehicles, the fuel vapor canister may not be completely cleared of contents following a purge, as the airflow through the canister is not uniform. If the vehicle is parked in a hot or sunny location over a diurnal cycle, the retained hydrocarbons may desorb from the canister and result in bleed emissions.

Bleed emissions may be limited by adding a secondary "bleed" canister to capture desorbed hydrocarbons. However, this adds additional cost, weight, and packaging to the vehicle. Even with a bleed canister, a car parked outside for multiple diurnal cycles may experience bleed from the bleed canister itself. Further, in hybrid vehicles, a highly restrictive bleed canister may impede fuel tank depressurization prior to a refueling sequence.

The inventors herein have recognized the above issues, and have developed systems and methods to at least partially address them. In one example, a method for a fuel system, comprising: during a first condition, including an engine-off condition and a sealed fuel tank, directing fresh air into a fuel vapor canister responsive to detecting hydrocarbons in a canister vent line. By directing fresh air into the fuel vapor canister, fuel vapor stored within the canister may be redistributed away from the canister vent line. In this way bleed emissions from the fuel system may be reduced without the need for a dedicated bleed canister.

In another example, a fuel system, comprising: a fuel vapor canister; an air pump coupled between a vent port of the fuel vapor canister and atmosphere; and a controller configured with instructions stored in non-transitory memory, that when executed, cause the controller to: redistribute fuel vapor within the fuel vapor canister away from the vent port by activating the air pump. By redistributing the fuel vapor away from the vent port, bleed emissions may be reduced in vehicles parked in warm or sunny conditions for multiple diurnal cycles. In this way, hybrid vehicles and other vehicles which have limited opportunities to purge to intake during operation may meet stringent emissions standards.

In yet another example, a method for a vehicle, comprising: responsive to a vehicle-off event, setting a hydrocarbon breakthrough detection strategy; responsive to a hydrocarbon sensor output increasing above a threshold, opening a canister purge valve coupled within a canister purge line; coupling a canister vent port to the canister purge line; coupling a canister purge port to a vacuum pump; maintaining a fuel tank isolation valve closed; and activating the vacuum pump. By setting a hydrocarbon breakthrough detection strategy, battery power may be conserved while maintaining the ability of the hydrocarbon sensor to detect canister breakthrough. In this way, bleed emissions may be effectively countered based on the output of the hydrocarbon sensor.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

FIG. 1 schematically shows an example vehicle propulsion system.

FIG. 2 schematically shows an example vehicle system with a fuel system and an evaporative emissions system.

Figure 6:
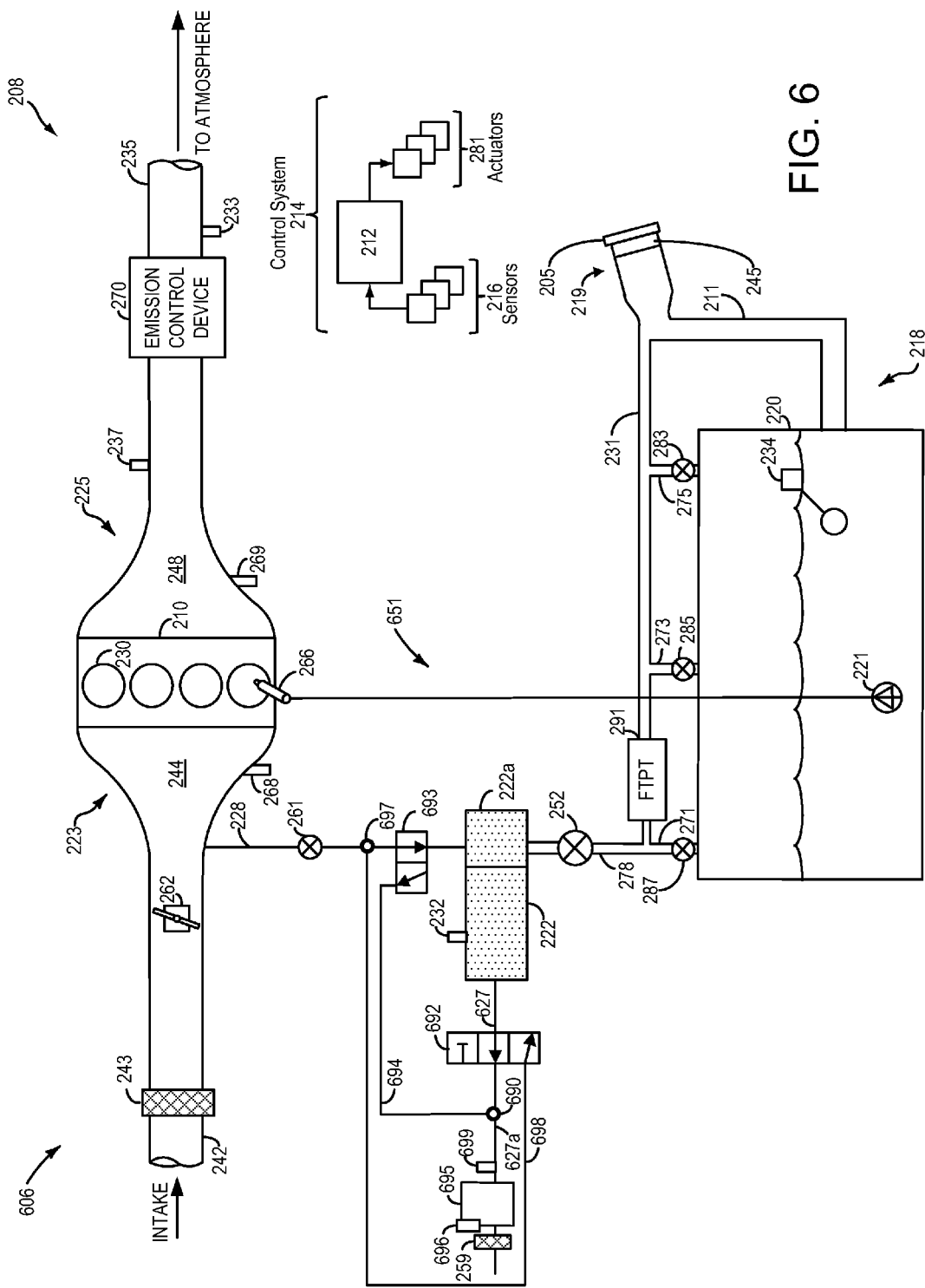

FIG. 6 schematically shows an example vehicle system with a fuel system and an evaporative emissions system configured to reverse air flow through a fuel vapor canister.

Figure 7A:
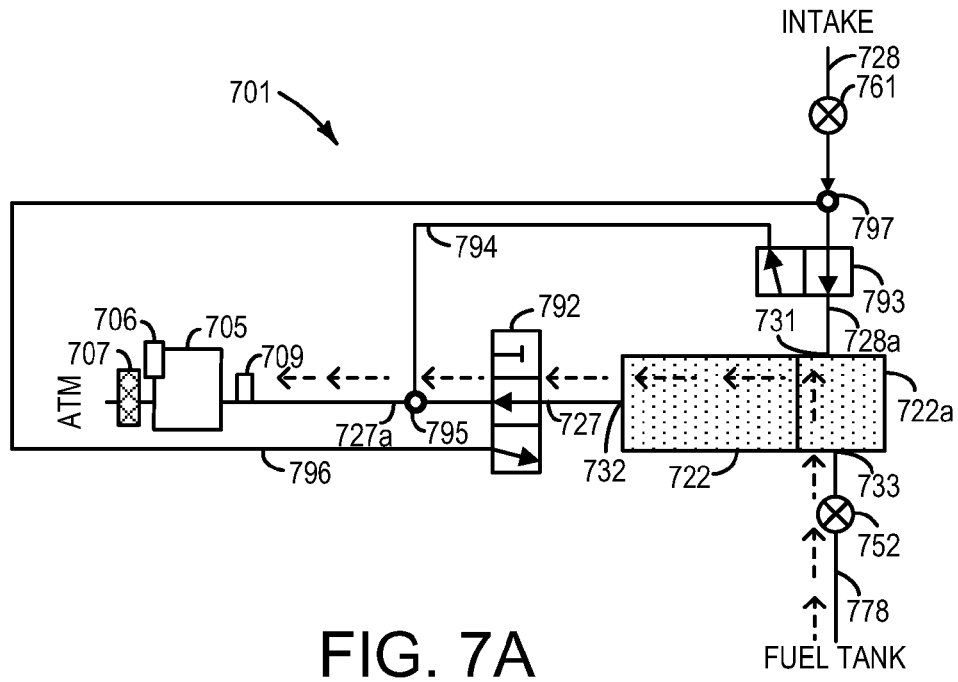

FIG. 7A schematically shows an evaporative emissions system in a configuration to perform a fuel system leak test.

Figure 7B:
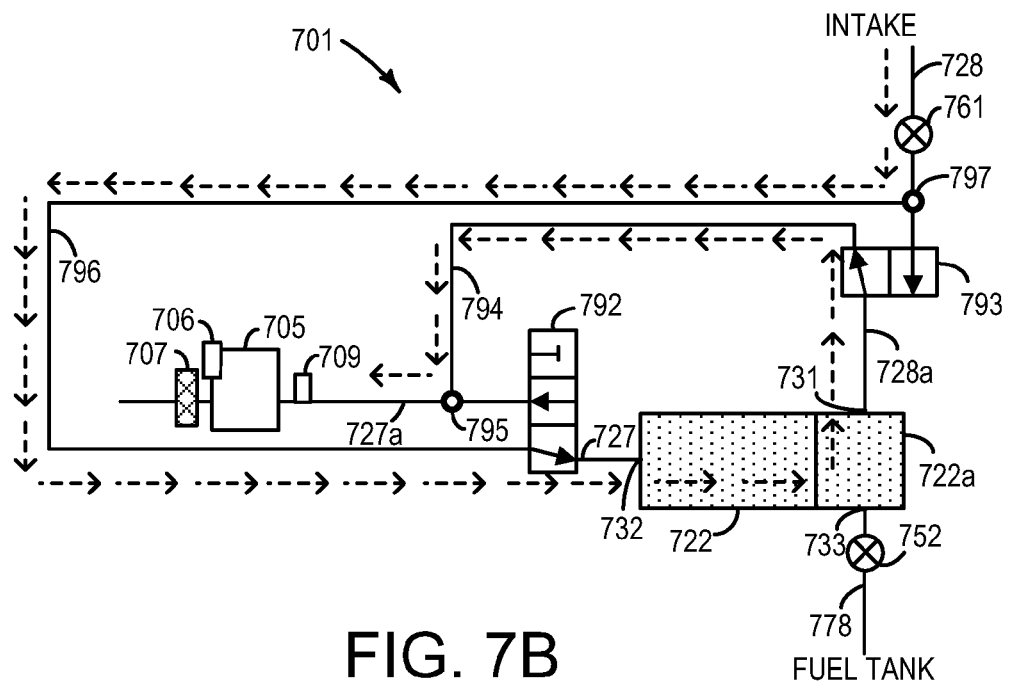

FIG. 7B schematically shows an evaporative emissions system in a configuration to divert fuel vapor away from a fuel vapor canister vent port.

Figure 8A:
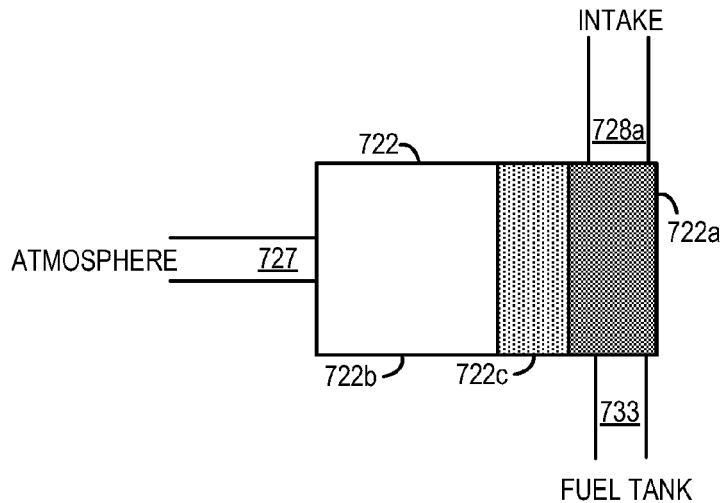
Figure 8B:
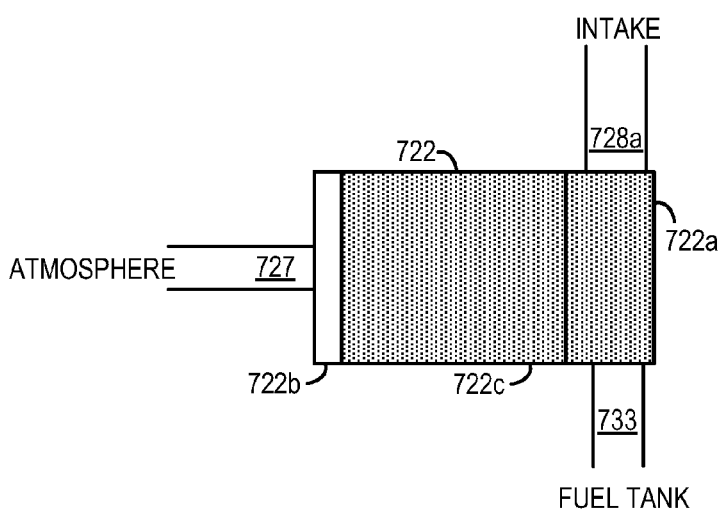
Figure 8C:
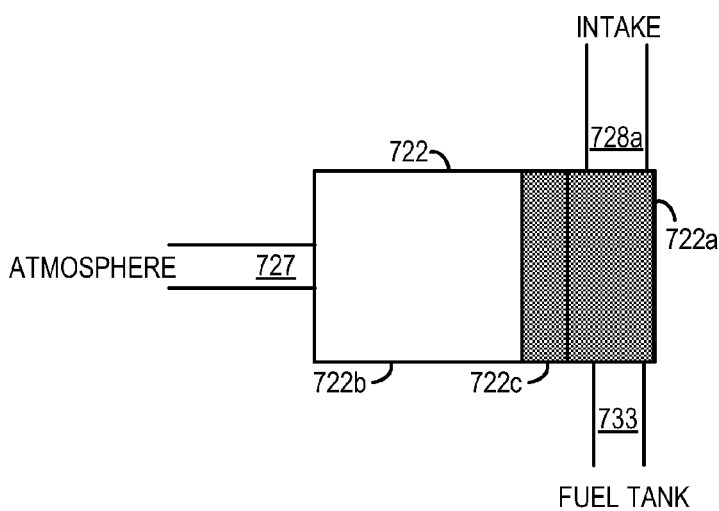

FIGS. 8A-C schematically show a fuel vapor canister in various states of fuel vapor distribution.

Figure 9:
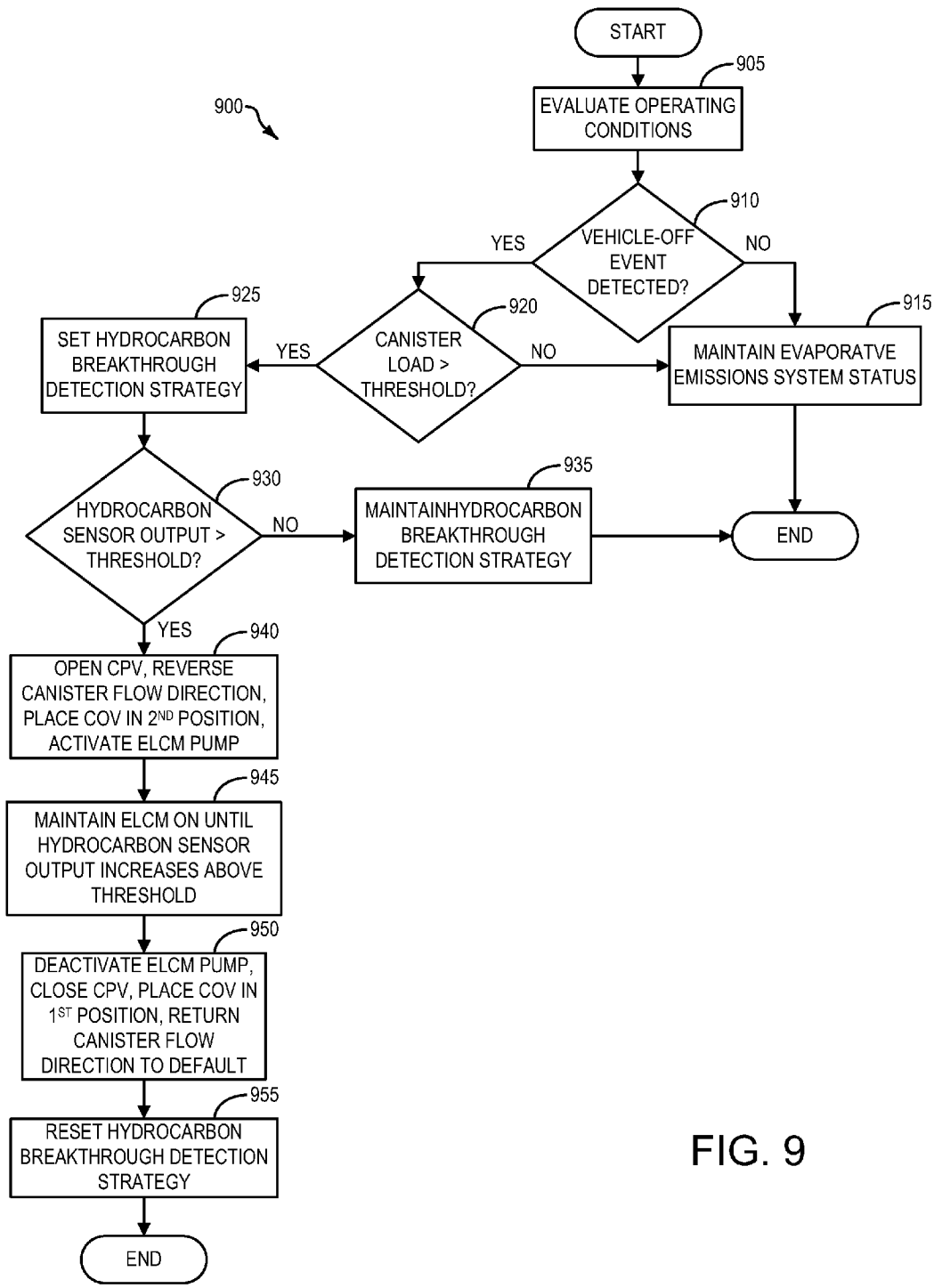

FIG. 9 shows a flow chart for an example method for reducing bleed emissions using the systems shown in FIGS. 6, 7A, 7B, and 8.

Figure 10:
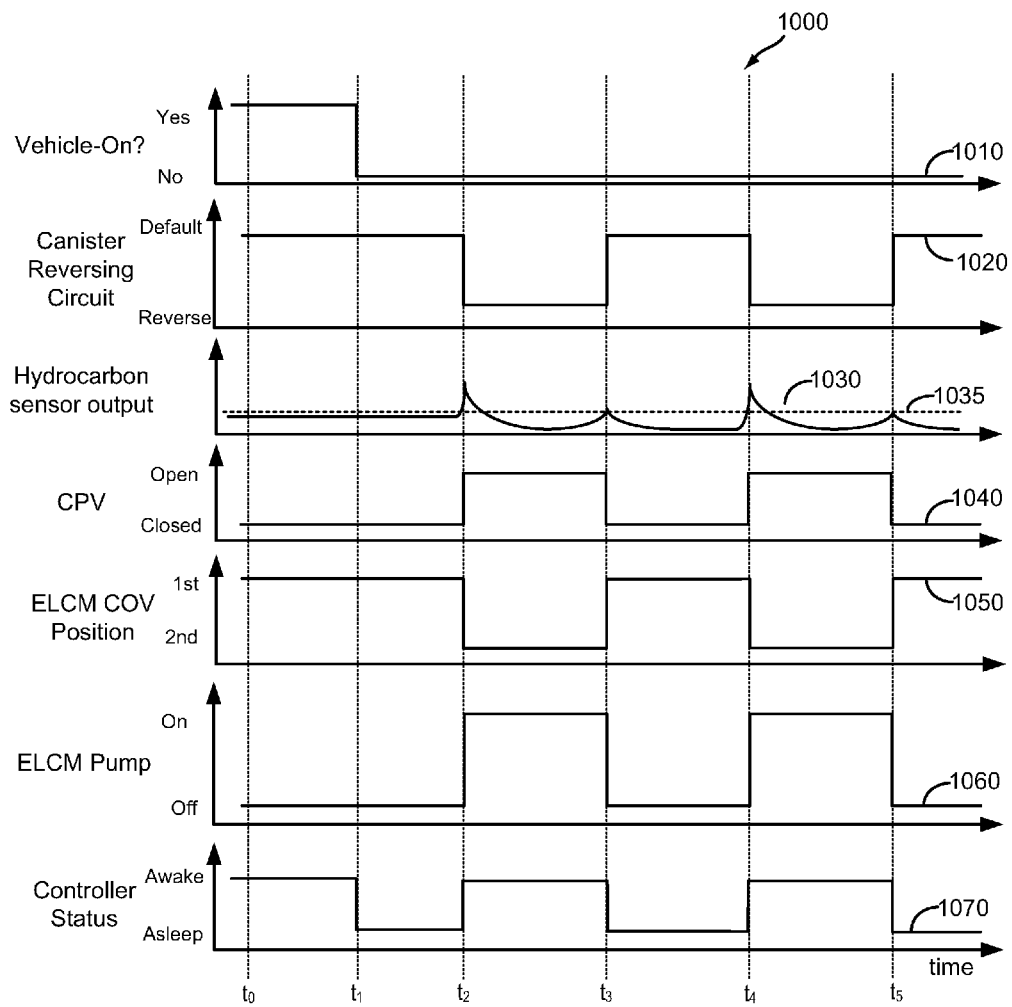

FIG. 10 shows a timeline for an example routine for reducing bleed emissions using the method of FIG. 9.

DETAILED DESCRIPTION

This detailed description relates to systems and methods for reducing bleed emission in fuel systems. Specifically, this description relates to systems and methods for redistributing fuel vapor within a fuel vapor canister during a vehicle-off condition. The fuel vapor canister may be included in a plug-in hybrid vehicle (PHEV), such as the PHEV schematically depicted in FIG. 1. The fuel vapor canister may be included in an evaporative emissions system coupled to a fuel system, as shown schematically in FIG. 2. The evaporative emissions system may include an evaporative leak check module (ELCM), operable in multiple conformations, such as the conformations shown in FIGS.

Figure 4:
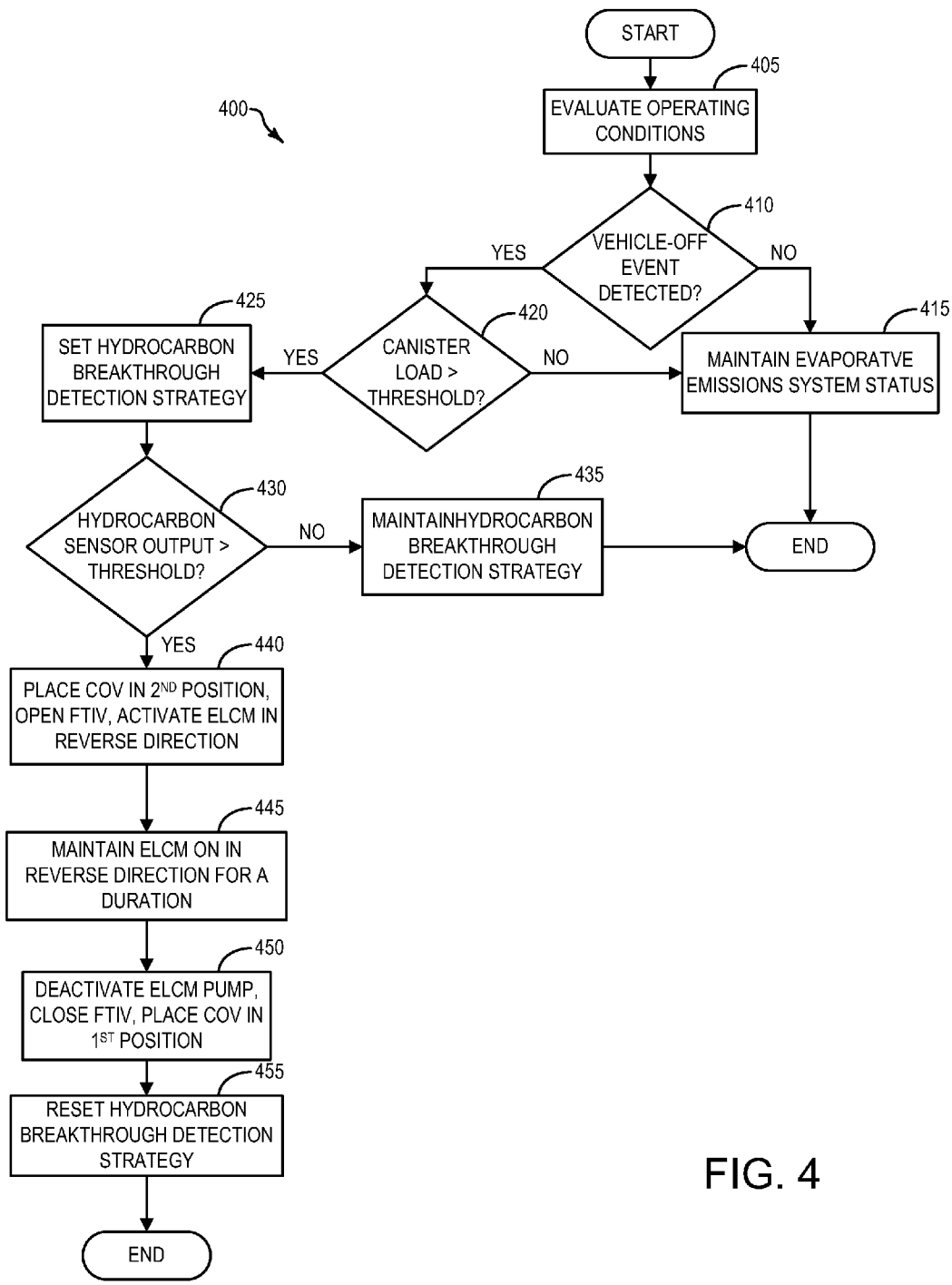
FIG. 4 shows a flow chart for an example method for reducing bleed emissions using the systems shown in FIGS. 2 and 3A-3D.
Figure 5:
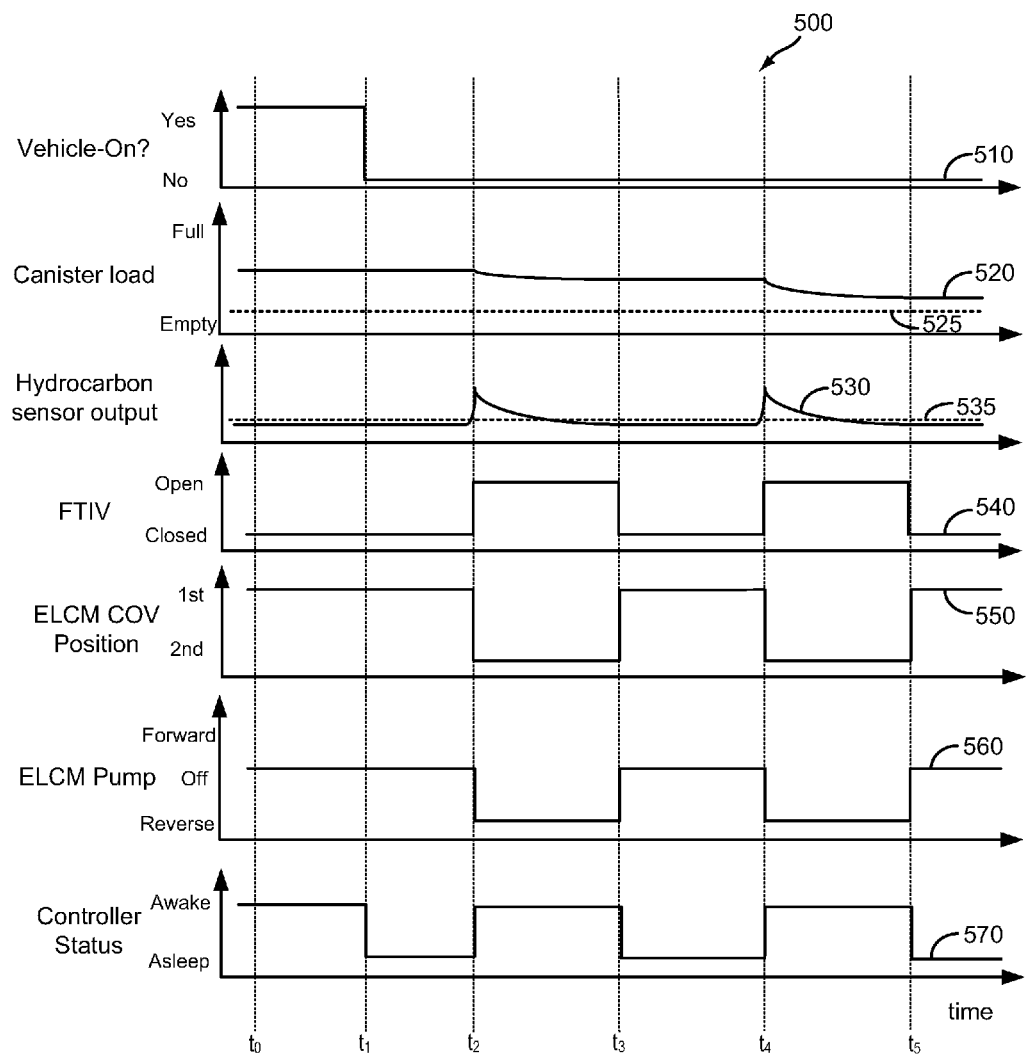
FIG. 5 shows a timeline for an example routine for reducing bleed emissions using the method of FIG. 4.

3A-3D. Using the systems of FIGS. 1, 2, and 3A-3D, bleed emissions may be managed by the example method shown in FIG. 4. A timeline for a bleed emissions management operation using the method of FIG. 4 is shown in FIG. 5. In some examples, the evaporative emissions system may be configured to reverse air flow through the fuel vapor canister, as shown in FIG. 6. Using the ELCM, air may be drawn through the canister in two directions, as shown by FIGS. 7A-7B. In this way, fuel vapor stored within the canister may be redistributed away from the canister vent port, as shown in FIGS. 8A-8C. Using the systems of FIGS. 6 and 7A-7B, bleed emissions may be managed by the example method shown in FIG. 9. A timeline for a bleed emissions management operation using the method of FIG. 9 is shown in FIG. 10.

Figure 1:
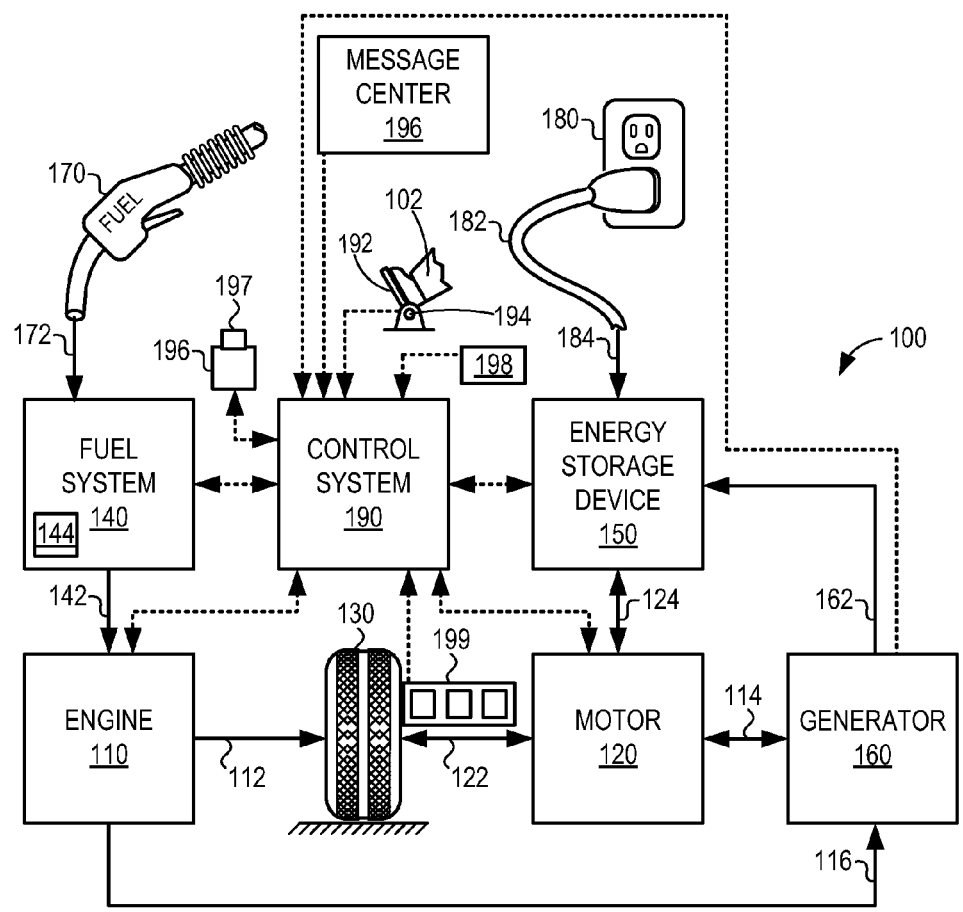

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g. gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. As will be described by the process flow of FIGS. 7 and 9, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g. not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g. as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

Figure 2:
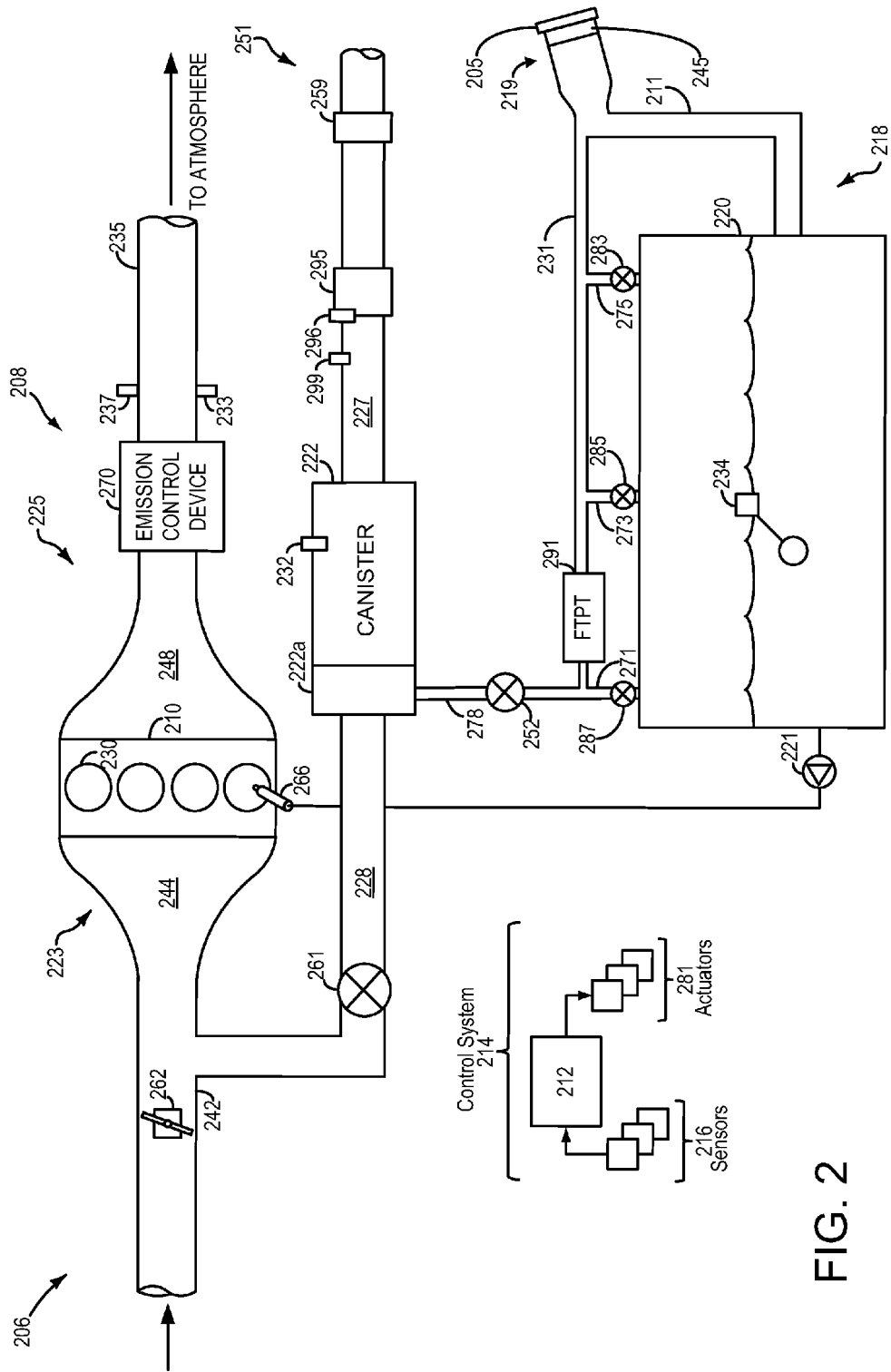

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure. Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve coupled within vent line 227. When included, the canister vent valve may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 while closing isolation valve 252. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291, and canister temperature sensor 243. Other sensors such as pressure, temperature, air/fuel ratio, and composition sensors may be coupled to various locations in the vehicle system 206. As another example, the actuators may include fuel injector 266, throttle 262, fuel tank isolation valve 253, pump 292, and refueling lock 245. The control system 214 may include a controller 212. The controller may receive input data from the various sensors, process the input data, and trigger the actuators in response to the processed input data based on instruction or code programmed therein corresponding to one or more routines. Example control routines are described herein with regard to FIGS. 7 and 9.

Leak detection routines may be intermittently performed by controller 212 on fuel system 218 to confirm that the fuel system is not degraded. As such, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, leak detection routines may be performed while the engine is running by operating a vacuum pump and/or using engine intake manifold vacuum. Leak tests may be performed by an evaporative leak check module (ELCM) 295 communicatively coupled to controller 212. ELCM 295 may be coupled in vent 227, between canister 222 and the atmosphere. ELCM 295 may include a vacuum pump for applying negative pressure to the fuel system when administering a leak test. In some embodiments, the vacuum pump may be configured to be reversible. In other words, the vacuum pump may be configured to apply either a negative pressure or a positive pressure on the fuel system. ELCM 295 may further include a reference orifice and a pressure sensor 296. Following the applying of vacuum to the fuel system, a change in pressure at the reference orifice (e.g., an absolute change or a rate of change) may be monitored and compared to a threshold. Based on the comparison, a fuel system leak may be diagnosed. A hydrocarbon sensor 299 may be coupled at or near ELCM 295 within vent line 227.

Figure 3A:
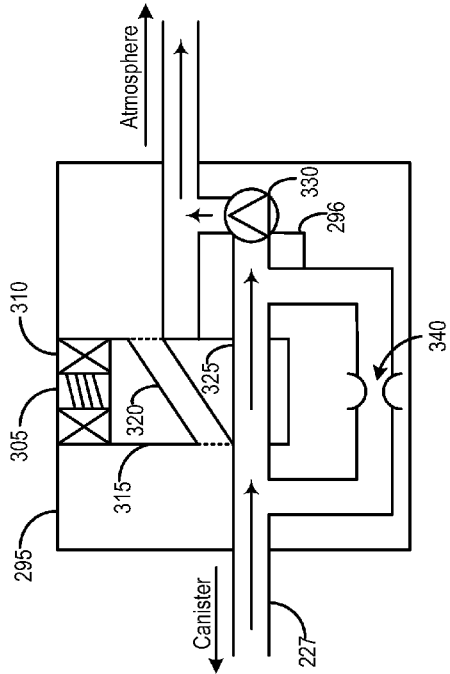
FIG. 3A shows a schematic depiction of an evaporative leak check module in a configuration to perform a reference check.
Figure 3B:
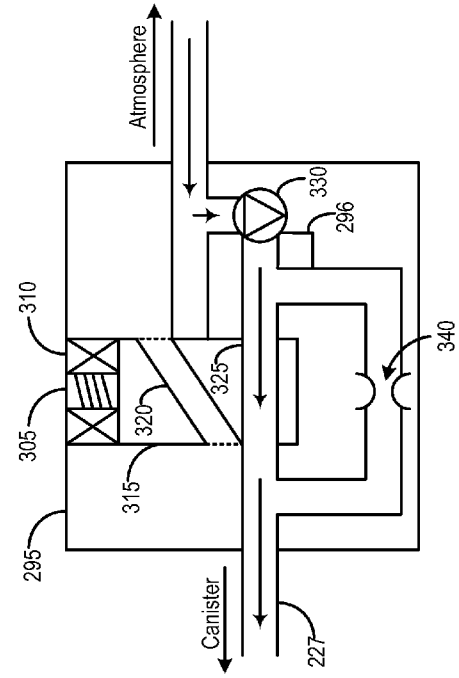
FIG. 3B shows a schematic depiction of an evaporative leak check module in a configuration to perform a fuel system evacuation leak check.
Figure 3C:
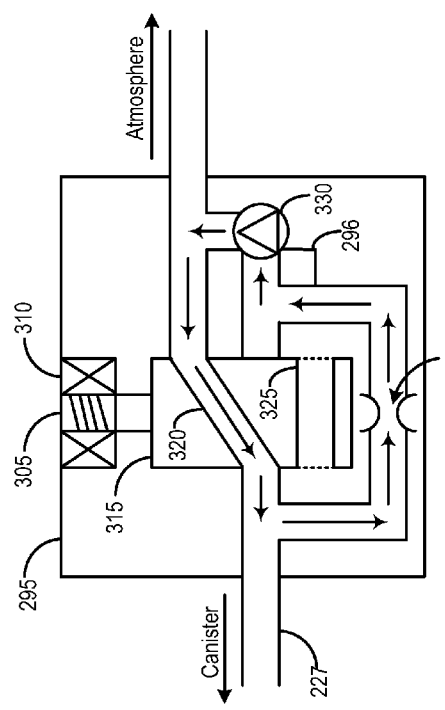
FIG. 3C shows a schematic depiction of an evaporative leak check module in a configuration to perform a purge operation.
Figure 3D:
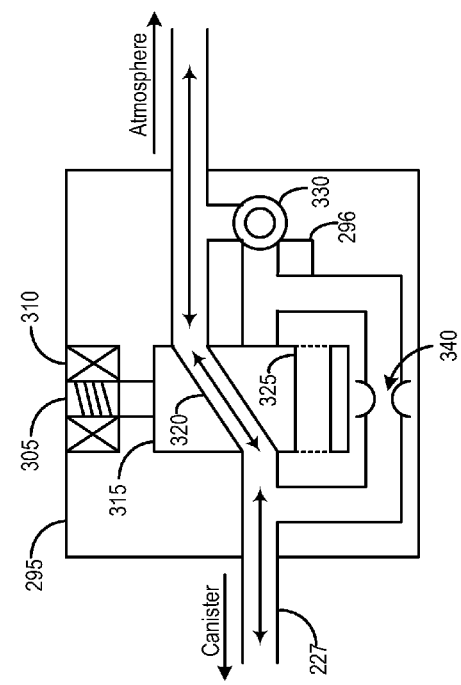
FIG. 3D shows a schematic depiction of an evaporative leak check module in a configuration to pump air into a fuel system.

FIGS. 3A-3D show a schematic depiction of an example ELCM 295 in various conditions in accordance with the present disclosure. As shown in FIG. 2, ELCM 295 may be located along vent 227 between canister 222 and atmosphere. ELCM 295 includes a changeover valve (COV) 315, a pump 330, and a pressure sensor 296. Pump 330 may be a reversible pump, for example, a vane pump. COV 315 may be moveable between a first a second position. In the first position, as shown in FIGS. 3A and 3C, air may flow through ELCM 295 via first flow path 320. In the second position, as shown in FIGS. 3B and 3D, air may flow through ELCM 295 via second flow path 325. The position of COV 315 may be controlled by solenoid 310 via compression spring 305. ELCM 295 may also comprise reference orifice 340. Reference orifice 340 may have a diameter corresponding to the size of a threshold leak to be tested, for example, 0.02". In either the first or second position, pressure sensor 296 may generate a pressure signal reflecting the pressure within ELCM 295. Operation of pump 330 and solenoid 310 may be controlled via signals received from controller 212.

As shown in FIG. 3A, COV 315 is in the first position, and pump 330 is activated in a first direction. Fuel tank isolation valve 252 (not shown) is closed, isolating ELCM 295 from the fuel tank. Air flow through ELCM 295 in this configuration is represented by arrows. In this configuration, pump 330 may draw a vacuum on reference orifice 340, and pressure sensor 296 may record the vacuum level within ELCM 295. This reference check vacuum level reading may then become the threshold for passing/failing a subsequent leak test.

As shown in FIG. 3B, COV 315 is in the second position, and pump 330 is activated in the first direction. This configuration allows pump 330 to draw a vacuum on fuel system 18. In examples where fuel system 18 includes FTIV 252, FTIV 252 may be opened to allow pump 330 to draw a vacuum on fuel tank 220. Air flow through ELCM 295 in this configuration is represented by arrows. In this configuration, as pump 330 pulls a vacuum on fuel system 218, the absence of a leak in the system should allow for the vacuum level in ELCM 295 to reach or exceed the previously determined vacuum threshold. In the presence of a leak larger than the reference orifice, the pump will not pull down to the reference check vacuum level.

As shown in FIG. 3C, COV 315 is in the first position, and pump 330 is de-activated. This configuration allows for air to freely flow between atmosphere and the canister. This configuration may be used during a canister purging operation, for example.

As shown in FIG. 3D, COV 315 is in the second position, and pump 330 is activated in a second direction, opposite from the first direction. In this configuration, pump 330 may pull air from atmosphere into fuel system 218. In a configuration where FTIV 252 is open and CPV 261 is closed, air drawn by pump 330 may promote desorption of fuel vapor from canister 222, and further direct the desorbed fuel vapor into fuel tank 220. In this way, fuel vapor may be purged from the canister to the fuel tank, thereby decreasing the potential for bleed emissions.

In some vehicles, a separate bleed canister may be coupled between the fuel vapor canister and atmosphere. However, even with a bleed canister, a car parked outside for multiple diurnal cycles may emit desorbed hydrocarbons from the bleed canister itself. Further, in hybrid vehicles, a highly restrictive bleed canister may impede fuel tank depressurization prior to a refueling sequence. Rather than relying on a dedicated bleed canister, the systems of FIGS. 2 and 3A-D may be utilized to minimize bleed emissions by redistributing the fuel vapors within the fuel vapor canister while the vehicle is off.

FIG. 4 shows a flow chart for an example high-level method 400 for reducing bleed emissions utilizing a dual-function ELCM in a plug-in hybrid vehicle in accordance with the present disclosure. Method 400 will be described with relation to the systems shown in FIGS. 2 and 3A-3D, but it should be understood that similar methods may be used with other systems without departing from the scope of this disclosure. Method 400 may be stored as instructions in non-transitory memory and carried out by controller 212.

Method 400 may begin at 405 by estimating operating conditions. Operating conditions may be measured, estimated, or inferred, and may include ambient conditions, such as temperature, humidity, and barometric pressure, as well as vehicle conditions, such as engine operating status, fuel level, fuel tank pressure, fuel vapor canister load status, etc. Continuing at 410, method 400 may include determining whether a vehicle-off event is detected, such as a key-off event. If no vehicle-off event is detected, method 400 may proceed to 415. At 415, method 400 may include maintaining the status of the evaporative emissions system. Method 400 may then end.

If a vehicle-off event is detected, method 400 may proceed to 420. At 420, method 400 may include determining whether the canister load is above a threshold. Canister load may be determined empirically, or inferred. For example, changes in canister temperature as determined by canister temperature sensor 232 may be used to determine the amount of fuel vapor adsorbed to the canister, and/or the amount of fuel vapor desorbed during a purge routine. If the canister had previously been purged from a known canister load, an amount of fuel vapor purged may be determined, for example by changes in A/F ratio during the purge event. If the canister load is not above the load threshold, method 400 may proceed to 415 and maintain the status of the evaporative emissions system. Method 400 may then end.

If the canister load is above the load threshold, method 400 may proceed to 425. At 425, method 400 may include setting a hydrocarbon detection strategy. In one example, the hydrocarbon detection strategy may include sleeping controller 212, and then waking controller 212 after a duration. The duration may be pre-determined, or may be based on operating conditions, such as canister load, ambient temperature, etc. When the controller is re-awakened, hydrocarbon breakthrough from canister 222 may be measured by hydrocarbon sensor 299. In another example, while the controller sleeps, a hot-at-all-times circuit may be maintained at full power, coupling the output of the hydrocarbon sensor to a wake input of the controller. When the hydrocarbon sensor output is above the threshold, the controller will wake up and restore operations to full power. The hot-at-all-times circuit may couple the output of the hydrocarbon sensor to a gain module to increase the signal reaching the wake input. The gain module may be calibrated for different regions depending on allowable evaporative emissions standards.

Once the hydrocarbon detection strategy has been determined, method 400 may proceed to 430. At 430, method 400 may include determining whether the hydrocarbon sensor output is greater than a threshold. For examples where the controller is put to sleep and re-awoken after a duration, the hydrocarbon sensor output may be determined at a time point when the controller is re-awoken. For examples where the controller is coupled to the hydrocarbon sensor via a wake input, the hydrocarbon sensor output may be determined continuously. If the hydrocarbon sensor output is not above a threshold, method 400 may proceed to 435. At 435, method 400 may include maintaining the hydrocarbon breakthrough detection strategy. For examples where the controller is put to sleep and re-awoken after a duration, the controller may be put back to sleep and re-awoken after a duration. The duration may be the same as the previous sleeping duration, or may be adjusted based on current operating and ambient conditions. For examples where the vehicle controller is coupled to the hydrocarbon sensor via a wake input, the controller may be kept asleep while maintaining the hot-at-all-times circuit on. Method 400 may then end.

If the output of the hydrocarbon sensor is greater than the threshold, method 400 may proceed to 440. At 440, method 400 may include placing the ELCM COV in the $2^{nd}$ position (or otherwise coupling the fuel vapor canister to atmosphere via the ELCM pump), opening the FTIV, and activating the ELCM in the reverse direction. This ELCM conformation is shown in FIG. 3D. In this conformation, the ELCM will pump atmospheric air through the fuel vapor canister, desorbing hydrocarbons bound to adsorbent. With the CPV closed and the FTIV open, the desorbed hydrocarbons will be directed into the fuel tank, passively purging the contents of the canister to the fuel tank. In this way, bleed emissions that would normally occur over one or more diurnal cycles may be mitigated without requiring an additional bleed canister. In some examples, the FTIV may be maintained closed. In this configuration, the hydrocarbons will not be purged from the canister; rather the hydrocarbons will be redistributed away from the vent port, further into the interior of the canister.

For vehicles not equipped with an ELCM or other suitable pump, the passive purge operation may not be able occur. In some examples, upon detection of hydrocarbons, the CVV may be closed, sealing the evaporative emissions system and preventing the escape of desorbed hydrocarbons. For vehicles equipped with a canister cooling circuit, detection of hydrocarbons may result in the cooling of the canister, thereby decreasing the rate of hydrocarbon migration towards the vent line. This may be effective for hybrid vehicles coupled to a power source for battery charging, as the cooling circuit may be powered by the power source, rather than the vehicle battery.

Continuing at 445, method 400 may include maintaining the ELCM pump on in the reverse direction for a duration. The duration may be predetermined, or may be based on operating conditions. For example, the ELCM pump may be maintained on until the output of the hydrocarbon sensor is less than a threshold. Such a threshold may be the same as the hydrocarbon sensor output threshold that triggered the purge event, or may be different. In some examples, the ELCM pump may be maintained on until a fuel tank pressure reaches a threshold.

Continuing at 450, following the purge duration, method 400 may proceed to 450. At 450, method 400 may include deactivating the ELCM pump, closing the FTIV (if opened), and returning the ELCM COV to the $1^{st}$ position. This ELCM configuration is shown in FIG. 3C. By closing the FTIV, the desorbed hydrocarbons are sealed within the fuel tank.

Continuing at 455, method 400 may include resetting the hydrocarbon breakthrough strategy. The strategy may include putting the controller to sleep. For examples where the controller is put to sleep and re-awoken after a duration, the same duration may be used as at 425, or a new duration may be set based on current operating conditions. For where the controller is coupled to the hydrocarbon sensor via a wake input, the threshold for waking the controller may be the same as used at 425, or may be adjusted based on current operating conditions. Method 400 may then end.

FIG. 5 shows an example timeline 500 for managing bleed emissions in a hybrid vehicle using the method described herein and with regards to FIG. 4 as applied to the system described herein and with regards to FIGS. 1, 2, and 3A-D. Timeline 500 includes plot 510, indicating a vehicle-on status over time. Timeline 500 further includes plot 520, indicating a fuel vapor canister load over time. Line 525 indicates a canister load threshold. Timeline 500 further includes plot 530, indicating the output of a hydrocarbon sensor coupled within the canister vent line over time. Line 535 indicates a hydrocarbon sensor output threshold. Timeline 500 further includes plot 540, indicating the status of a fuel tank isolation valve over time, and plot 550, indicating the status of an ELCM changeover valve over time. Timeline 500 further includes plot 560, indicating the status of a reversible ELCM pump over time, and plot 570, indicating the status of a controller over time.

At time $t_0$, the vehicle is on, as shown by plot 510. Accordingly, the FTIV is closed, the ELCM COV is in the first position, the ELCM pump is off, and the vehicle controller is on, as shown by plots 540, 550, 560, and 570, respectively. At time $t_1$, the vehicle is turned off, as shown by plot 510. The statuses of the FTIV, ELCM COV, and ELCM pump are maintained. The CPV may be considered to be maintained closed throughout timeline 500. The canister load is above the canister load threshold represented by line 525, as shown in plot 520. Accordingly, a hydrocarbon detection strategy is set, and the controller is put into a sleep mode, as shown by plot 570.

At time $t_2$, the hydrocarbon sensor output increases above the threshold represented by line 535, indicating that hydrocarbons have begun migrating out of the fuel vapor canister. Accordingly, the vehicle controller is awoken, the ELCM is placed in the second position, the FTIV is opened, and the ELCM pump is turned on in the reverse direction. The canister load decreases during the purge operation, and the hydrocarbon sensor output also decreases. At time $t_3$, the purge duration ends. The FTIV is closed, trapping the desorbed hydrocarbons in the fuel tank. The ELCM COV is returned to the $1^{st}$ position, and the ELCM pump is turned off. The hydrocarbon sensor output is below the threshold represented by line 535, but the canister load remains above the threshold represented by line 525. Accordingly, the hydrocarbon detection strategy is reset, and the controller is returned to sleep.

At time $t_4$, the hydrocarbon sensor output again increases above the threshold represented by line 535. Accordingly, the vehicle controller is awoken, the ELCM is placed in the second position, the FTIV is opened, and the ELCM pump is turned on in the reverse direction. The canister load decreases during the purge operation, and the hydrocarbon sensor output also decreases. At time $t_5$, the purge duration ends. The FTIV is closed, trapping the desorbed hydrocarbons in the fuel tank. The ELCM COV is returned to the $1^{st}$ position, and the ELCM pump is turned off. The hydrocarbon sensor output is below the threshold represented by line 535, but the canister load remains above the threshold represented by line 525. Accordingly, the hydrocarbon detection strategy is reset, and the controller is returned to sleep.

FIG. 6 shows an alternative configuration for a hybrid vehicle 606 including an evaporative emissions system 651 comprising a canister flow reversing circuit. In this example, the flow of air and vapors between canister 222 and the atmosphere may be regulated by a canister vent valve 692 coupled within vent line 627. The portion of vent line 627 on the atmospheric side of canister vent valve 692 is designated as 627a. As shown in FIG. 6, vent valve 692 is a multi-position valve, movable between a first, second, and third position, allowing for the selection of different pathways for fresh air entering the canister. The conformation of vent valve 692 may be regulated in conjunction with the position of reversing valve 693. ELCM 695 may be configured with a pump operable in a single direction, drawing air from the evaporative emissions system towards atmosphere. ELCM 695 may be coupled to pressure sensor 696 and hydrocarbon sensor 699. Example configurations are described further herein and with regard to FIGS. 7A-7B. Briefly, vent line 627 may be coupled to reversing valve 693 via conduit 694 and junction 690. Purge line 228 may be coupled to vent valve 692 via conduit 698 and junction 697. In the configuration shown in FIG. 6, ELCM 295 may draw a vacuum on canister 222 when CPV 261 is closed, with air directed from the buffer side of the canister through the main canister compartment. If vent valve 692 is placed in a second position, and reversing valve 693 is placed in a second position, ELCM 695 may draw air through CPV 261 may draw a vacuum on canister 222 when CPV 261 is closed, with air directed from the main canister compartment to the buffer side of the canister.

FIGS. 7A-7B show an example evaporative emissions system 701 including a circuit for reversing the flow of air through fuel vapor canister 722. In FIG. 7A, vent valve 792 is shown in a first conformation and reversing valve 793 is shown in a first conformation. In this example, FTIV 752 may be considered open, purge valve 761 may be considered closed, and ELCM 705 may be considered in a configuration where the ELCM COV is in the $2^{nd}$ position and the vacuum pump is on (see FIG. 3B, for example). When vent valve 792 is in the first conformation, fuel vapor canister 722 is fluidly coupled to ELCM 705 via vent line 727 and vent line segment 727a. When reversing valve 793 is in the first conformation, fuel vapor canister buffer 722a may be fluidly coupled to the engine intake via purge line 728 and purge line segment 728a when purge valve 761 is open.

The configuration shown in FIG. 7A may be used in an ELCM based leak test on the fuel system and fuel tank. As the ELCM vacuum pump applies a vacuum to the fuel system, fuel vapor will exit the fuel tank via conduit 778, pass through FTIV 752, and enter canister buffer 722a at load port 733, as shown by the dashed arrows. Fuel vapor will adsorb within canister buffer 722a and/or canister 722. Air stripped of fuel vapor will exit canister 722 at vent port 732, pass through vent line 727, vent valve 792, junction 795, and vent line segment 727a before reaching ELCM 705. The vacuum level at ELCM 705 may be measured by pressure sensor 706, and compared to a threshold to determine the integrity of the fuel system. Hydrocarbon sensor 709 may indicate hydrocarbon breakthrough from canister 722. Air may exit ELCM 705 to atmosphere via air filter 707.

FIG. 7B shows vent valve 792 in a second conformation and reversing valve 793 in a second conformation. In this example, FTIV 752 may be considered closed, purge valve 761 may be considered open, and ELCM 705 may be considered in a configuration where the ELCM COV is in the $2^{nd}$ position and the vacuum pump is on. When in this configuration, fuel vapor canister buffer 722a is fluidly coupled to ELCM 705 via conduit 794 and purge line segment 728a, while fuel vapor canister 722 is fluidly coupled to intake via vent line 727, conduit 796 and purge line 728.

In the conformation shown in FIG. 7B, ELCM 705 may be used to redistribute fuel vapor within fuel vapor canister 722 away from vent port 732 in order to reduce bleed emissions. As the ELCM vacuum pump applies a vacuum to the fuel system, atmospheric air will be drawn in through the intake manifold, entering the evaporative emissions system via purge line 728. Air will follow the dashed arrows, passing through purge valve 761 and junction 797 into conduit 796, then passing through vent valve 792 and vent line 727, entering canister 722 via vent port 732. The air entering the fuel vapor canister will cause hydrocarbons bound near the vent port to desorb, re-adsorbing closer to purge port 731. Air stripped of hydrocarbons then exits the fuel vapor canister at purge port 731, entering purge line segment 728a, and then passing through reversing valve 793 into conduit 794. The air will then pass through junction 795 and vent line segment 727a before reaching ELCM 705. If hydrocarbon sensor 709 detects hydrocarbons while the system is in this configuration, it would signify hydrocarbon breakthrough from canister buffer 722a. At this point, the fuel vapor may be considered redistributed as far from vent port 732 as possible, and the ELCM may be shut off, and vent valve 792 and reversing valve 793 may be returned to their default ($1^{st}$) conformations.

FIG. 8A-8C show fuel vapor canister 722 and canister buffer 722a in various states of fuel vapor distribution. FIG. 8A shows fuel vapor canister 722 and canister buffer 722a at a vehicle-off event following a purging event. Canister buffer 722a has a relatively high concentration of fuel vapor. Region 722b has a relatively low concentration of fuel vapor and region 722c has a relatively moderate concentration of fuel vapor.

FIG. 8B shows fuel vapor canister 722 and canister buffer 722a following either an ELCM based leak test or a two-day diurnal soak. Hydrocarbons from canister buffer 722a and region 722c have diffused towards vent line 727. Canister buffer 722a and region 722c now have a relatively moderate concentration of fuel vapor, and region 722c has expanded to a greater region of canister 722 than in FIG. 8A. Further diffusion into region 722b will lead to hydrocarbon breakthrough into vent line 727.

FIG. 8C shows fuel vapor canister 722 and canister buffer 722a following a fuel vapor redistribution event, such as described with regard to FIG. 7B. Fuel vapor has been pushed away from vent line 727 by ELCM 705. Canister buffer 722a and region 722c now have a relatively high concentration of fuel vapor, and region 722c is significantly smaller than in FIG. 8B. Region 722b has expanded to a greater region of canister 722 than in FIG. 8B. Hydrocarbon breakthrough is mitigated temporarily.

FIG. 9 shows a flow chart for an example high-level method 400 for reducing bleed emissions utilizing a dual-function ELCM in a plug-in hybrid vehicle in accordance with the present disclosure. Method 400 will be described with relation to the systems shown in FIGS. 3A-3C, 6, and 7A-7B but it should be understood that similar methods may be used with other systems without departing from the scope of this disclosure. Method 900 may be stored as instructions in non-transitory memory and carried out by controller 212.

Method 900 may begin at 905 by estimating operating conditions. Operating conditions may be measured, estimated, or inferred, and may include ambient conditions, such as temperature, humidity, and barometric pressure, as well as vehicle conditions, such as engine operating status, fuel level, fuel tank pressure, fuel vapor canister load status, etc. Continuing at 910, method 900 may include determining whether a vehicle-off event is detected, such as a key-off event. If no vehicle-off event is detected, method 900 may proceed to 915. At 915, method 900 may include maintaining the status of the evaporative emissions system. Method 900 may then end.

If a vehicle-off event is detected, method 900 may proceed to 920. At 920, method 900 may include determining whether the canister load is above a threshold. Canister load may be determined empirically, or inferred. For example, changes in canister temperature as determined by canister temperature sensor 232 may be used to determine the amount of fuel vapor adsorbed to the canister, and/or the amount of fuel vapor desorbed during a purge routine. If the canister had previously been purged from a known canister load, an amount of fuel vapor purged may be determined, for example by changes in A/F ratio during the purge event. If the canister load is not above the load threshold, method 900 may proceed to 915 and maintain the status of the evaporative emissions system. Method 900 may then end.

If the canister load is above the load threshold, method 900 may proceed to 925. At 925, method 900 may include setting a hydrocarbon detection strategy. In one example, the hydrocarbon detection strategy may include sleeping controller 212, and then waking controller 212 after a duration. The duration may be pre-determined, or may be based on operating conditions, such as canister load, ambient temperature, etc. When the controller is re-awakened, hydrocarbon breakthrough from canister 222 may be measured by hydrocarbon sensor 699. In another example, while the controller sleeps, a hot-at-all-times circuit may be maintained at full power, coupling the output of the hydrocarbon sensor to a wake input of the controller. When the hydrocarbon sensor output is above the threshold, the controller will wake up and restore operations to full power. The hot-at-all-times circuit may couple the output of the hydrocarbon sensor to a gain module to increase the signal reaching the wake input. The gain module may be calibrated for different regions depending on allowable evaporative emissions standards.

Once the hydrocarbon detection strategy has been determined, method 900 may proceed to 930. At 930, method 900 may include determining whether the hydrocarbon sensor output is greater than a threshold. For examples where the controller is put to sleep and re-awoken after a duration, the hydrocarbon sensor output may be determined at a time point when the controller is re-awoken. For examples where the controller is coupled to the hydrocarbon sensor via a wake input, the hydrocarbon sensor output may be determined continuously. If the hydrocarbon sensor output is not above a threshold, method 900 may proceed to 935. At 935, method 900 may include maintaining the hydrocarbon breakthrough detection strategy. For examples where the controller is put to sleep and re-awoken after a duration, the controller may be put back to sleep and re-awoken after a duration. The duration may be the same as the previous sleeping duration, or may be adjusted based on current operating and ambient conditions. For examples where the controller is coupled to the hydrocarbon sensor via a wake input, the controller may be kept asleep while maintaining the hot-at-all-times circuit on. Method 900 may then end.

If the output of the hydrocarbon sensor is greater than the threshold, method 900 may proceed to 940. At 940, method 900 may include opening the CPV, reversing the canister flow direction, placing the ELCM COV in the $2^{nd}$ position (or otherwise coupling the fuel vapor canister to atmosphere via the ELCM pump), and activating the ELCM. This ELCM conformation is shown in FIG. 3B. The canister flow may be reversed by placing vent valve 792 in a second conformation and placing reversing valve 793 in a second conformation. This conformation is shown in FIG. 7B. In this conformation, the ELCM will draw atmospheric air through intake via the CPV. The air will then flow through the reversing circuit, into the main body of the canister, and out of the canister buffer. In this way, hydrocarbons adsorbed in the fuel vapor canister will be redistributed towards the canister buffer and away from the canister vent port. In this way, bleed emissions that would normally occur over one or more diurnal cycles may be mitigated without requiring an additional bleed canister.

Continuing at 945, method 900 may include maintaining the ELCM pump until the hydrocarbon sensor output increases above the threshold. As atmospheric air exits the fuel vapor canister buffer, it flows through the vent line to atmosphere via the ELCM. As hydrocarbons are redistributed towards the canister buffer, hydrocarbon breakthrough at the canister purge port will eventually occur. This signifies that the hydrocarbons cannot be pushed further into the canister, and that the hydrocarbons are sufficiently desorbed away from the canister vent port.

Continuing at 950, upon the hydrocarbon sensor output increasing above the threshold, method 900 may proceed to 950. At 950, method 900 may include deactivating the ELCM pump, closing the CPV, returning the ELCM COV to the $1^{st}$ position, and returning the canister reversing circuit to the default configuration, with both the vent valve and reversing valve in their respective first configurations. This ELCM configuration is shown in FIG. 3C. This reversing circuit configuration is shown in FIG. 7A.

Continuing at 955, method 900 may include resetting the hydrocarbon breakthrough strategy. The strategy may include putting the controller to sleep. For examples where the controller is put to sleep and re-awoken after a duration, the same duration may be used as at 925, or a new duration may be set based on current operating conditions. For where the controller is coupled to the hydrocarbon sensor via a wake input, the threshold for waking the controller may be the same as used at 925, or may be adjusted based on current operating conditions. Method 900 may then end.

FIG. 10 shows an example timeline 1000 for managing bleed emissions in a hybrid vehicle using the method described herein and with regards to FIG. 9 as applied to the system described herein and with regards to FIGS. 3A-3C, 6, and 7A-7B. Timeline 1000 includes plot 1010, indicating a vehicle-on status over time. Timeline 1000 further includes plot 1020, indicating a canister reversing circuit status over time. Timeline 1000 further includes plot 1030, indicating the output of a hydrocarbon sensor coupled within the canister vent line over time. Line 1035 indicates a hydrocarbon sensor output threshold. Timeline 1000 further includes plot 1040, indicating the status of a fuel tank isolation valve over time, and plot 1050, indicating the status of an ELCM changeover valve over time. Timeline 1000 further includes plot 1060, indicating the status of an ELCM pump over time, and plot 1070, indicating the status of a controller over time.

At time $t_0$, the vehicle is on, as shown by plot 1010. Accordingly, the canister reversing circuit is in the default configuration, the CPV is closed, the ELCM COV is in the first position, the ELCM pump is off, and the vehicle controller is on, as shown by plots 1020, 1040, 1050, 1060, and 1070, respectively. At time $t_1$, the vehicle is turned off, as shown by plot 1010. The statuses of the canister reversing circuit, CPV, ELCM COV, and ELCM pump are maintained. The FTIV may be considered to be maintained closed throughout timeline 1000. Accordingly, a hydrocarbon detection strategy is set, and the controller is put into a sleep mode, as shown by plot 1070.

At time $t_2$, the hydrocarbon sensor output increases above the threshold represented by line 1035, indicating that hydrocarbons have begun migrating out of the fuel vapor canister. Accordingly, the vehicle controller is awoken, the canister reversing circuit is placed in the reverse configuration, the ELCM is placed in the second position, the CPV is opened, and the ELCM pump is turned on. The hydrocarbon sensor output initially decreases during the purge operation. At time $t_3$, the hydrocarbon sensor output increases above the threshold, as hydrocarbons are now breaking through the canister purge port. Accordingly, the canister reversing circuit is returned to the default configuration, the CPV is closed, the ELCM COV is returned to the $1^{st}$ position, and the ELCM pump is turned off. Accordingly, the hydrocarbon detection strategy is reset, and the controller is returned to sleep.

At time $t_4$, the hydrocarbon sensor output again increases above the threshold represented by line 1035. Accordingly, the vehicle controller is awoken, the canister reversing circuit is placed in the reverse configuration, the ELCM is placed in the second position, the CPV is opened, and the ELCM pump is turned on. The hydrocarbon sensor output initially decreases during the purge operation. At time $t_5$, the hydrocarbon sensor output increases above the threshold, as hydrocarbons are now breaking through the canister purge port. Accordingly, the canister reversing circuit is returned to the default configuration, the CPV is closed, the ELCM COV is returned to the $1^{st}$ position, and the ELCM pump is turned off. Accordingly, the hydrocarbon detection strategy is reset, and the controller is returned to sleep.

The systems described herein and depicted in FIGS. 1, 2, 3A-3D, 6, 7A-7B, and 8A-8C, along with the methods described herein and with regard to FIGS. 4 and 9 may enable one or more methods and one or more systems. In one example, a method for a fuel system, comprising: during a first condition, including an engine-off condition and a sealed fuel tank, directing fresh air into a fuel vapor canister responsive to detecting hydrocarbons in a canister vent line. Directing fresh air into the fuel vapor canister may comprise directing fresh air into a vent port coupling the fuel vapor canister to the canister vent line, and may further comprise activating a vacuum pump coupled within the canister vent line. The vacuum pump may be coupled within an evaporative leak check module. In some examples, the vacuum pump may be operable in a first direction to direct fresh air into the fuel vapor canister and further operable in a second direction to draw a vacuum on the fuel vapor canister. The method may further comprise adjusting a conformation of a vent valve coupled between the fuel vapor canister and a vent line inlet and adjusting a conformation of a reversing valve coupled between a fuel vapor canister buffer and an engine intake. In some examples, the method may further comprise opening a canister purge valve coupled between the fuel vapor canister buffer and the engine intake; and drawing fresh air through the canister purge valve and into the vent port, and may further comprise deactivating the vacuum pump responsive to detecting hydrocarbons in the canister vent line. Detecting hydrocarbons in a canister vent line may comprise: following a vehicle-off event, sleeping a controller; waking the controller after a pre-determined duration; and measuring a hydrocarbon concentration in the canister vent line with a hydrocarbon sensor. In some examples detecting hydrocarbons in a canister vent line comprises: following a vehicle-off event, sleeping a controller while maintaining a hydrocarbon sensor coupled within the canister vent line on, the hydrocarbon sensor communicatively coupled to a wake input of the controller; and waking the controller responsive to a hydrocarbon sensor output increasing above a threshold. The technical result of implementing this system is a reduction in bleed emissions that does not require a dedicated bleed canister. In this way, manufacturing costs may be reduced, and operations such as fuel tank depressurization may be executed without impedance from a restrictive element in the vent pathway.

In another example, a fuel system, comprising: a fuel vapor canister; an air pump coupled between a vent port of the fuel vapor canister and atmosphere; and a controller configured with instructions stored in non-transitory memory, that when executed, cause the controller to: redistribute fuel vapor within the fuel vapor canister away from the vent port by activating the air pump. The fuel system may further comprise a fuel tank isolation valve coupled between the fuel vapor canister and a fuel tank; and wherein the controller is further configured with instructions stored in non-transitory memory, that when executed, cause the controller to: maintain the fuel tank isolation valve closed while redistributing fuel vapor within the fuel vapor canister away from the vent port. The air pump may be coupled within an evaporative leak check module coupled within a vent line coupled between the vent port and atmosphere, the air pump configured to draw a vacuum on the fuel vapor canister. In some examples, the air pump is operable in a first direction to draw a vacuum on the fuel vapor canister and further operable in a second direction to direct fresh air into the fuel vapor canister. The fuel system may further comprise a reversing valve coupled between a fuel vapor canister buffer and a purge line, the reversing valve operable between a first conformation and a second conformation and configured to: couple the fuel vapor canister buffer to the purge line when in the first conformation; and couple the fuel vapor canister buffer to the air pump when in the second conformation; and a canister vent valve coupled between the fuel vapor canister and the vent line, the canister vent valve operable between a first conformation and a second conformation and configured to: couple the fuel vapor canister to the air pump when in the first conformation; couple the reversing valve to the air pump when in the second conformation; and couple the vent port to the purge line when in the second conformation. In some examples, the fuel system may further comprise: a hydrocarbon sensor coupled within the vent line; a purge valve coupled within the purge line; and wherein the controller may be further configured with instructions stored in non-transitory memory, that when executed, cause the controller to: responsive to a hydrocarbon sensor output increasing above a threshold, open the purge valve; place the canister vent valve in the second conformation; place the reversing valve in the second conformation; and activate the air pump. In some examples, the controller may be further configured with instructions stored in non-transitory memory, that when executed, cause the controller to: responsive to a hydrocarbon sensor output increasing above a threshold, close the purge valve; place the canister vent valve in the first conformation; place the reversing valve in the first conformation; and activate the air pump. The hydrocarbon sensor may be communicatively coupled to a wake input of the controller, and the controller may be further configured with instructions stored in non-transitory memory, that when executed, cause the controller to: sleep following a vehicle-off event; and wake responsive to a hydrocarbon sensor output increasing above a threshold. The technical result of implementing this system is a reduction in bleed emissions in vehicles parked in warm or sunny conditions over multiple diurnal cycles. In this way, hybrid vehicles and other vehicles which have limited opportunities to purge to intake during operation, and thus may be parked with a canister holding fuel vapor may meet stringent emissions standards.

In yet another example, a method for a vehicle, comprising: responsive to a vehicle-off event, setting a hydrocarbon breakthrough detection strategy; responsive to a hydrocarbon sensor output increasing above a threshold, opening a canister purge valve coupled within a canister purge line; coupling a canister vent port to the canister purge line; coupling a canister purge port to a vacuum pump; maintaining a fuel tank isolation valve closed; and activating the vacuum pump. Setting a hydrocarbon breakthrough detection strategy includes: sleeping a controller following a vehicle-off event; maintaining awake a hydrocarbon sensor coupled to a wake input of the controller; and waking the controller responsive to the wake input indicating that the hydrocarbon sensor output increased above the threshold. The technical result of implementing this method is a conservation of battery power while maintaining the ability of the hydrocarbon sensor to detect canister breakthrough. In this way, bleed emissions may be effectively countered based on the output of the hydrocarbon sensor.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a fuel system, comprising:
during a first condition, including an engine-off condition and a sealed fuel tank, directing fresh air into a fuel vapor canister responsive to detecting hydrocarbons in a canister vent line.

2. The method of claim 1, wherein directing fresh air into the fuel vapor canister comprises:
directing fresh air into a vent port coupling the fuel vapor canister to the canister vent line.

3. The method of claim 2, wherein directing fresh air into the fuel vapor canister further comprises:
activating a vacuum pump coupled within the canister vent line.

4. The method of claim 3, where the vacuum pump is coupled within an evaporative leak check module.

5. The method of claim 4, where the vacuum pump is operable in a first direction to direct fresh air into the fuel vapor canister and further operable in a second direction to draw a vacuum on the fuel vapor canister.

6. The method of claim 3, further comprising:
adjusting a conformation of a vent valve coupled between the fuel vapor canister and a vent line inlet and adjusting a conformation of a reversing valve coupled between a fuel vapor canister buffer and an engine intake.

7. The method of claim 6, further comprising:
opening a canister purge valve coupled between the fuel vapor canister buffer and the engine intake; and
drawing fresh air through the canister purge valve and into the vent port.

8. The method of claim 7, further comprising:
deactivating the vacuum pump responsive to detecting hydrocarbons in the canister vent line.

9. The method of claim 1, where detecting hydrocarbons in the canister vent line comprises:
following a vehicle-off event, sleeping a controller;
waking the controller after a pre-determined duration; and
measuring a hydrocarbon concentration in the canister vent line with a hydrocarbon sensor.

10. The method of claim 1, where detecting hydrocarbons in the canister vent line comprises:

following a vehicle-off event, sleeping a controller while maintaining a hydrocarbon sensor coupled within the canister vent line on, the hydrocarbon sensor communicatively coupled to a wake input of the controller; and waking the controller responsive to a hydrocarbon sensor output increasing above a threshold.

11. A fuel system, comprising:

a fuel vapor canister;

an air pump coupled between a vent port of the fuel vapor canister and atmosphere;

a controller configured with instructions stored in non-transitory memory, that when executed, cause the controller to:

redistribute fuel vapor within the fuel vapor canister away from the vent port by activating the air pump; and a fuel tank isolation valve coupled between the fuel vapor canister and a fuel tank, wherein the controller is further configured with instructions stored in non-transitory memory, that when executed, cause the controller to:

maintain the fuel tank isolation valve closed while redistributing fuel vapor within the fuel vapor canister away from the vent port.

12. The fuel system of claim 11, wherein the air pump is coupled within an evaporative leak check module coupled within a vent line coupled between the vent port and atmosphere, the air pump configured to draw a vacuum on the fuel vapor canister.

13. The fuel system of claim 12, wherein the air pump is operable in a first direction to draw a vacuum on the fuel vapor canister and further operable in a second direction to direct fresh air into the fuel vapor canister.

14. The fuel system of claim 12, further comprising:

a reversing valve coupled between a fuel vapor canister buffer and a purge line, the reversing valve operable between a first conformation and a second conformation and configured to:

couple the fuel vapor canister buffer to the purge line when in the first conformation; and couple the fuel vapor canister buffer to the air pump when in the second conformation; and a canister vent valve coupled between the fuel vapor canister and the vent line, the canister vent valve operable between a first conformation and a second conformation and configured to:

couple the fuel vapor canister to the air pump when in the first conformation;

couple the reversing valve to the air pump when in the second conformation; and couple the vent port to the purge line when in the second conformation.

15. The fuel system of claim 14, further comprising:

a hydrocarbon sensor coupled within the vent line;

a purge valve coupled within the purge line; and wherein the controller is further configured with instructions stored in non-transitory memory, that when executed, cause the controller to:

responsive to a hydrocarbon sensor output increasing above a threshold, open the purge valve;

place the canister vent valve in the second conformation;

place the reversing valve in the second conformation; and activate the air pump.

16. The fuel system of claim 15, wherein the controller is further configured with instructions stored in non-transitory memory, that when executed, cause the controller to:

responsive to the hydrocarbon sensor output increasing above the threshold, close the purge valve;

place the canister vent valve in the first conformation;

place the reversing valve in the first conformation; and activate the air pump.

17. The fuel system of claim 15, where the hydrocarbon sensor is communicatively coupled to a wake input of the controller, and wherein the controller is further configured with instructions stored in non-transitory memory, that when executed, cause the controller to:

sleep following a vehicle-off event; and wake responsive to the hydrocarbon sensor output increasing above the threshold.

18. A method for a vehicle, comprising:

responsive to a vehicle-off event, setting a hydrocarbon breakthrough detection strategy;

responsive to a hydrocarbon sensor output increasing above a threshold, opening a canister purge valve coupled within a canister purge line;

coupling a canister vent port to the canister purge line;

coupling a canister purge port to a vacuum pump;

maintaining a fuel tank isolation valve closed; and activating the vacuum pump.

19. The method of claim 18, where setting the hydrocarbon breakthrough detection strategy includes:

sleeping a controller following the vehicle-off event;

maintaining awake a hydrocarbon sensor coupled to a wake input of the controller; and waking the controller responsive to the wake input indicating that the hydrocarbon sensor output increased above the threshold.

* * * * *